(12) United States Patent
Goodwin et al.

(10) Patent No.: US 7,775,317 B1
(45) Date of Patent: Aug. 17, 2010

(54) MULTI-DIRECTIONAL OPERATOR CONTROLS FOR AN INDUSTRIAL VEHICLE

(75) Inventors: Christopher J. Goodwin, Greenville, NC (US); Knut A. Raade, Winterville, NC (US); Eugene A. Helmetsie, Spencer, NY (US)

(73) Assignee: NMHG Oregon, LLC, Portland, OR (US)

( * ) Notice: Subject to any disclaimer, the term of this patent is extended or adjusted under 35 U.S.C. 154(b) by 437 days.

(21) Appl. No.: 11/779,177

(22) Filed: Jul. 17, 2007

Related U.S. Application Data

(60) Provisional application No. 60/831,724, filed on Jul. 17, 2006.

(51) Int. Cl.
*B60K 26/00* (2006.01)
(52) U.S. Cl. .................. 180/321; 180/322; 180/323; 180/333
(58) Field of Classification Search .............. 180/321, 180/322, 323, 326, 333, 335; 701/50
See application file for complete search history.

(56) References Cited

U.S. PATENT DOCUMENTS

| | | | |
|---|---|---|---|
| 1,672,212 A | 6/1928 | Hale | |
| 3,937,294 A | 2/1976 | Haddock | |
| 4,702,520 A * | 10/1987 | Whisler et al. | 297/411.36 |
| 5,887,669 A * | 3/1999 | Ostler et al. | 180/53.4 |
| 5,890,562 A | 4/1999 | Bartels et al. | |
| 6,182,778 B1 | 2/2001 | Henshaw et al. | |
| 6,390,764 B1 | 5/2002 | Merlo et al. | |
| 6,564,906 B1 | 5/2003 | Haack et al. | |
| 6,679,349 B1 | 1/2004 | Pollish, Jr. | |
| 6,694,240 B1 * | 2/2004 | Swick et al. | 701/50 |
| 6,971,194 B2 * | 12/2005 | McClelland et al. | 37/347 |
| 6,971,470 B2 | 12/2005 | McGoldrick | |
| 7,051,832 B2 | 5/2006 | Lewis et al. | |
| 7,121,608 B2 * | 10/2006 | Billger et al. | 296/65.06 |
| 7,484,587 B2 * | 2/2009 | Portscheller et al. | 180/329 |
| 2003/0127272 A1 * | 7/2003 | Baker et al. | 180/326 |
| 2005/0023070 A1 | 2/2005 | Smiley et al. | |
| 2007/0295551 A1 * | 12/2007 | Proud et al. | 180/333 |
| 2009/0223734 A1 * | 9/2009 | Frett et al. | 180/333 |

OTHER PUBLICATIONS

S01361156900 Manual Supplement; Model: H8.00-16.00XM-6; NAACO Materials Handling Group PTY LTD; pp. 1-10; Jan. 2006.

* cited by examiner

*Primary Examiner*—Toan C To
(74) *Attorney, Agent, or Firm*—Stolowitz Ford Cowger LLP

(57) ABSTRACT

A control assembly for an industrial vehicle is herein disclosed as including a first control arm oriented in a substantially upright position, and a second control arm extending from the first control arm in a reclined position. The first control arm is operable to control a speed of the vehicle from a first operator position, and the second control arm operable to control the speed of the vehicle from a second operator position oriented opposite the first operator position.

20 Claims, 6 Drawing Sheets

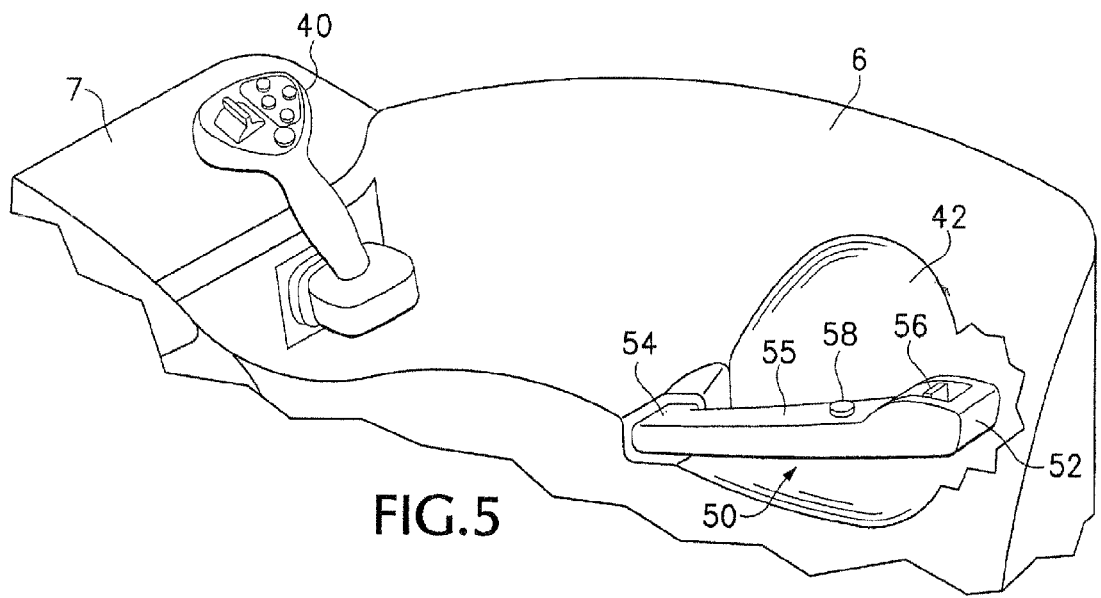
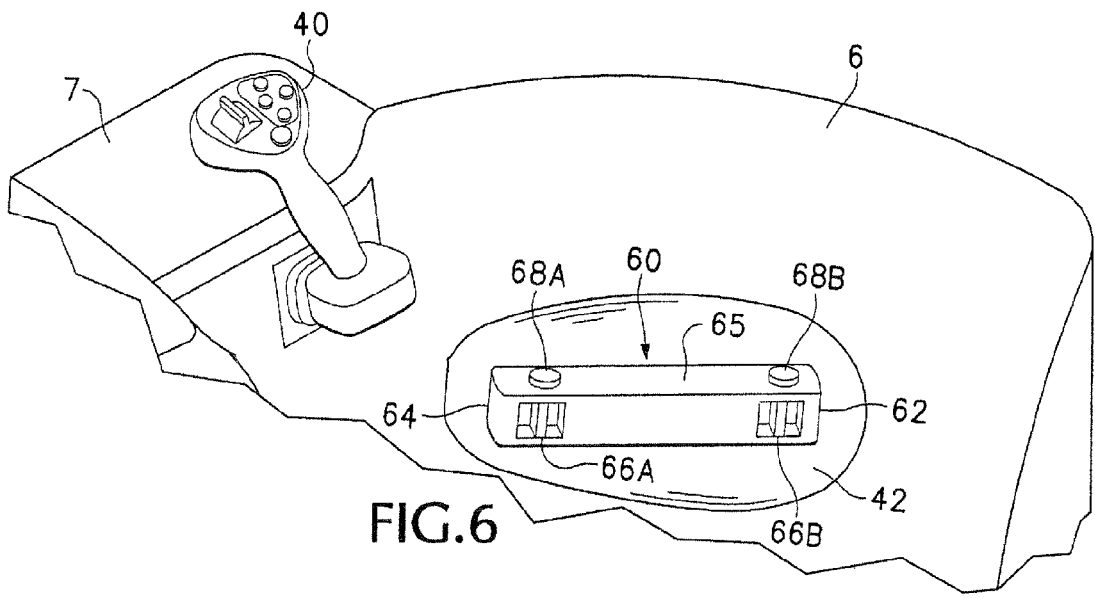

MULTI-DIRECTIONAL OPERATOR CONTROLS FOR AN INDUSTRIAL VEHICLE

This application claims priority from U.S. provisional patent application Ser. No. 60/831,724, filed on Jul. 17, 2006, and which is herein incorporated by reference in its entirety.

BACKGROUND

Electrical and industrialized vehicles, such as fork lift trucks, often include a multi-function control device that enables operation of a vehicle traction control, auxiliary functions, horn and other vehicle operations. The multi-function control device is typically provided at the front of the vehicle so that an operator may grasp the control device while facing in a forward direction. Ease of operation in a forward stance is provided with a single grip handle assembly.

While traveling in a reverse direction, the operator may be inclined to be repositioned in a rearward operator stance opposite the forward direction. However, the control devices are designed to be operated in only one of the operator orientations, not both, and more specifically are ergonomically designed to be operated exclusively by a right or left hand. Furthermore, it is difficult to locate a control device that can be comfortably operated from both the forward and rearward operator stances.

A steering control device may also be provided on the vehicle. The same steering control device is used to steer the vehicle regardless of the orientation of the operator. The steering control device does not provide the same intuitive steering for an operator oriented in a rearward stance with the vehicle traveling in reverse, as compared to operation of the vehicle from the forward stance in the forward direction of travel.

Vehicle operating systems including control devices at both the front and rear of the vehicle provide an ease of operation, however the separate control assemblies add additional components and complexity to the overall vehicle control system.

The present invention addresses these and other problems.

SUMMARY OF THE INVENTION

A control assembly for an industrial vehicle is herein disclosed as including a first control arm oriented in a substantially upright position, and a second control arm extending from the first control arm in a reclined position. The first control arm is operable to control a speed of the vehicle from a first operator position, and the second control arm operable to control the speed of the vehicle from a second operator position oriented opposite the first operator position.

A control system for an industrial vehicle is herein disclosed as including a first control handle located near a first side of an operator compartment opposite an operator ingress. The first control handle is configured to be rotated about one or more axes of rotation and control a rate of travel of the industrial vehicle. The control system further includes a second control handle rigidly mounted to the operator compartment. The second control handle is configured to control the rate of travel of the industrial vehicle without being rotated or pivoted about any axis.

An industrial vehicle control is herein disclosed as including a joystick having multiple vehicle controls and configured to control a direction of travel of the industrial vehicle, and a lever arm connected to the joystick. The connection of the lever arm and joystick form an angle whose apex is formed at the connection. The lever arm configured to extend a reach of the joystick in a direction transverse to the orientation of the joystick to enable control of the direction of travel of the industrial vehicle from different operator orientations.

BRIEF DESCRIPTION OF THE DRAWINGS

FIG. 5 is a close up perspective view of the primary and secondary controls illustrated in FIG. 4.

FIG. 6 illustrates an example embodiment of a primary and secondary control in an alternate arrangement.

DETAILED DESCRIPTION

Figure 1:
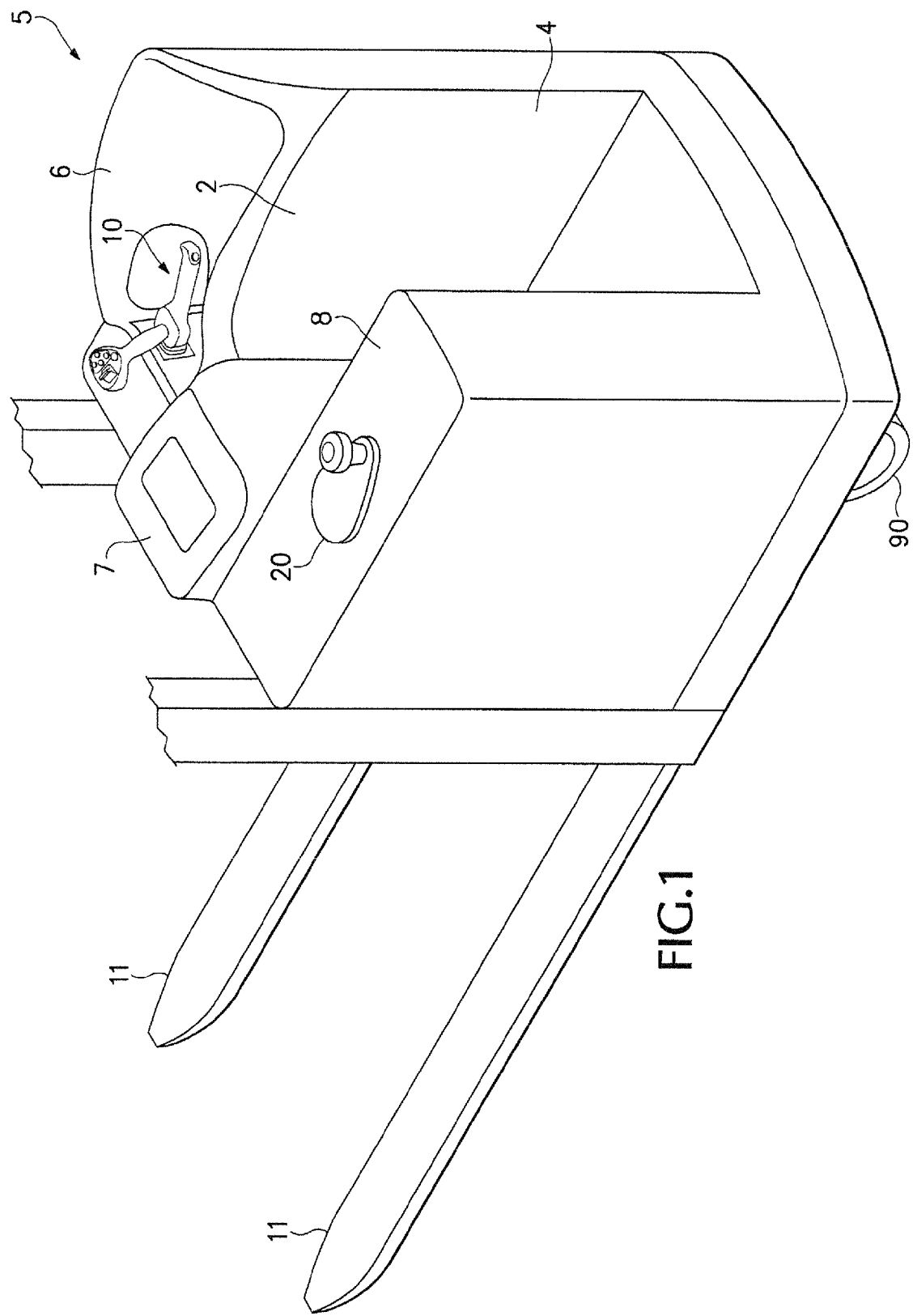
FIG. 1 is a rear elevation view of an industrial vehicle, illustrating a dual grip operator control.

FIG. 1 is a rear elevation view of an industrial vehicle 5, shown as an example electric fork lift truck, illustrating a dual grip operator control 10. For industrial vehicles with forward and rear facing operator positions, effective traction and horn controls are provided for each operator position. Vehicle controls are configured to provide an operator control of the vehicle 5 while facing the front 7 of an operator compartment 2, oriented towards the vehicle forks 11. The vehicle controls are also configured to provide the operator control of the vehicle 5 while facing the rear or ingress 4 of the vehicle 5, in a direction opposite the vehicle forks 11. The vehicle controls may include the dual grip operator control 10 located approximately at an end of the right side 6 of the operator compartment 2 towards the front portion 7. The vehicle controls may also include a steering apparatus 20, such as steering wheel, located at an approximate midpoint on a left side 8 of the operator compartment 2.

An improved multi-directional, multi-function dual grip operator control 10 provides control of traction and horn functions from a single control assembly located in the operator compartment 2. The dual grip operator control 10 may be configured to be operated from multiple operator positions, such as a forward or rearward operator stance. Two separate hand grips may be provided on the dual grip operator control 10 so that the vehicle can be operated from either a forward and rearward operator stance.

Figure 2:
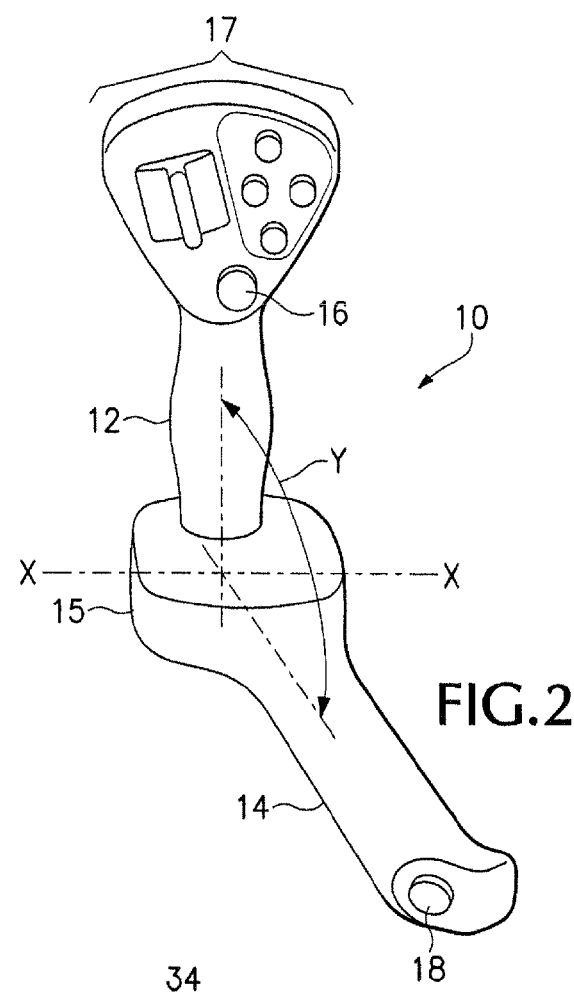
FIG. 2 is a close up perspective view illustrating the dual grip operator control of FIG. 1.

FIG. 2 is a close up perspective view illustrating the dual grip operator control 10 of FIG. 1. The dual grip operator control 10 may be positioned for ease of operation in forward and rearward operator positions, providing an operator with a comfortable hand grip position in any stance to reduce operator fatigue and improve operator productivity. By utilizing a common pivot mechanism and angle sensors, parts are reduced and the traction control system is simplified. Reducing parts and simplifying the control system improves reliability of the vehicle 5.

Two hand grip positions are provided on dual grip operator control 10. A primary hand grip 12 may be utilized by an operator when facing and operating the truck in a forward position facing the forks 11 of FIG. 1. The primary hand grip 12 may be a joy stick. The primary hand grip 12 provides the operator with multi-function controls 17 that may include traction, hoist, reach, tilt, side-shift or other vehicle functions when operating the vehicle 5. An alert function 16 may be provided on the primary hand grip 12, and may be configured as a horn button or switch. A secondary hand grip 14 may be utilized by the operator when facing and operating the vehicle 5 in a rearward position facing the back of the vehicle 5, in a direction opposite the forks 11. The secondary hand grip 14 may include traction control and a secondary alert button 18. A secondary alert button 18 may be configured as a horn button or switch, for example, and that may be operated by a thumb or finger of the operator.

The dual grip operator control 10 illustrated in FIG. 2 is shown as being a single control assembly, including a first control arm, or primary hand grip 12, oriented in a substantially upright position. The primary hand grip 12 may be configured to operate or control a speed of the vehicle 5 from a first operator position, such as when the operator faces the front 7 of the operator compartment 2 shown in FIG. 1.

The dual grip operator control 10 is also shown as including a second control arm, or secondary hand grip 14, which may extend or stem from the primary hand grip 12 in a reclined position. The secondary hand grip 14 may be configured to operate or control the speed of the vehicle 5 from a second operator position oriented opposite the first operator position. The second operator position may be associated with the operator facing the ingress 4 of the operator compartment 2 shown in FIG. 1. The first operator position may be associated with a first direction of vehicle travel, and the second operator position may be associated with a second direction of vehicle travel opposite the first direction.

The dual grip operator control may be provided as a control assembly, where the primary hand grip 12 and secondary hand grip 14 are rigidly connected to each other or assembled together. In one embodiment the dual drip operator control 10 is provided with the primary hand grip 12 and secondary hand grip 14 formed, molded or fabricated as an integral component.

A vehicle control assembly, including the dual grip operator control 10 and the steering apparatus 20 shown in FIG. 1, provides for additional flexibility of operator orientation and comfort. The steering apparatus 20 may be located on a side of a vehicle operator compartment opposite that of the dual grip operator control 10 including the primary and secondary hand grips 12, 14. The steering apparatus 20 may be positioned to be accessible to an operator operating the primary and secondary hand grips 12, 14.

The primary hand grip 12 and the steering apparatus 20 may be configured to be simultaneously operated in a first direction of vehicle travel, such as towards the vehicle forks 11. The secondary hand grip 14 and the steering apparatus 20 may be configured to be simultaneously operated in a second direction of vehicle travel opposite the first direction, or opposite the vehicle forks 11.

The primary and secondary hand grips 12, 14 of the dual grip operator control 10 may be a single axis lever type traction control mounted to a common pivot, illustrated as pivot axis X-X and sensor mechanism. The axis X-X may be located at a position external to the dual grip operator control 10, such as where the dual grip operator control 10 mounts to the front 7 or side 6 of the operator compartment 2 of FIG. 1.

The primary hand grip 12 may be mounted approximately vertically for stability and ease of operation when facing forward on the vehicle 5. The secondary hand grip 14 may be mounted approximately horizontally for accessibility when facing rearward on the vehicle. The secondary hand grip 14 may serve as a palm rest for operation of the primary hand grip 12.

As previously discussed, the primary hand grip 12 illustrated as a joystick in FIG. 2, may include multi-function controls 17 and be configured to control a direction of travel of the vehicle 5. The secondary hand grip 14 is shown connected to a base 15 of the primary hand grip 12, where the connection of the primary and second hand grips 12, 14 forms an angle Y whose apex is formed at the connection. The angle Y of attachment may determined by an angle formed between the upright position of the primary hand grip 12 and the reclined position of the secondary hand grip 14. In one embodiment, the angle Y forms an approximate right angle. In another embodiment, the angle Y forms an obtuse angle.

The secondary hand grip 14 may be configured to extend a reach of the primary hand grip 12 in a direction transverse to the orientation of the primary hand grip 12 to enable control of the direction of travel of the vehicle 5 from different operator orientations. The primary and secondary hand grips 12, 14 may be rigidly connected to each other. The angle Y of attachment between the primary and secondary hand grips 12, 14 may remain fixed while either of the primary and secondary hand grips 12, 14 is rotated about one or more axes of rotation, such as axis X-X.

Figure 3:
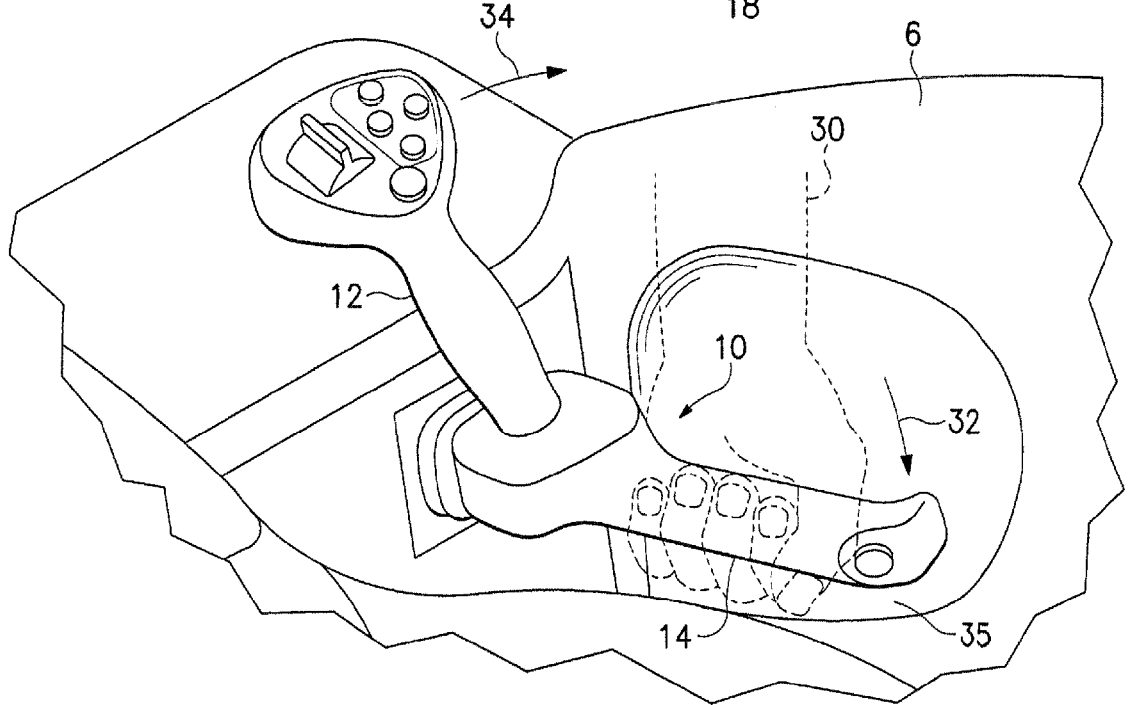
FIG. 3 is a partial view of an operator compartment illustrating an example application of the dual grip operator control of FIG. 1.

FIG. 3 is a partial view of right side 6 of the operator compartment 2 illustrating an example application of the dual grip operator control 10 of FIG. 1. The primary hand grip 12 may be configured to conform to an operator's right hand in a first operator orientation, for example with the operator facing the forks 11 of the vehicle 5. The left hand of the operator remains free to operate the steering apparatus 20 while the right hand operates the primary hand grip 12. In the partial view illustrated in FIG. 3, a left hand of an operator 30 is shown as an environmental element grasping the secondary hand grip 14. In one embodiment, the operator 30 is facing the ingress 4 of the vehicle 5 (see FIG. 1) while grasping the secondary hand grip 14. A right hand of the operator 30 remains free to operate the steering apparatus 20 while the left hand operates the secondary hand grip 14.

The secondary hand grip 14 may be configured to conform to the left hand of the operator 30 in a second operator orientation opposite the first operator orientation. The right side 6 of the operator compartment 6 may include a recess 35 that provides room to maneuver or otherwise accommodates the left hand of the operator 30 as the secondary hand grip 14 is being rotated downwards 32. The left hand of the operator 30, as well as the secondary hand grip 14, may descend into the recess 35 during the downward motion 32. The primary hand grip 12 may simultaneously rotate in a corresponding rotational direction 34 as the secondary hand grip 14 is rotated downwards 32.

A common sensor may be utilized to detect when either the primary or secondary hand grips 12, 14 is being rotated in one or more rotational directions, for example about the axis X-X of FIG. 2. In one embodiment, a rotation of either the primary or secondary hand grips 12, 14 results in the entire dual grip operator control 10 to rotate about a common axis. The dual grip operator control 10 may be rotated about axis X-X in a first rotational direction to request a forward direction of acceleration of the vehicle 5. The dual grip operator control 10 may be rotated about axis X-X in a second rotational direction opposite the first rotational direction, to request a reverse direction of acceleration of the vehicle 5. As such, either of the primary or secondary hand grips 12, 14 may be utilized to request a forward or reverse direction of travel.

Figure 4:
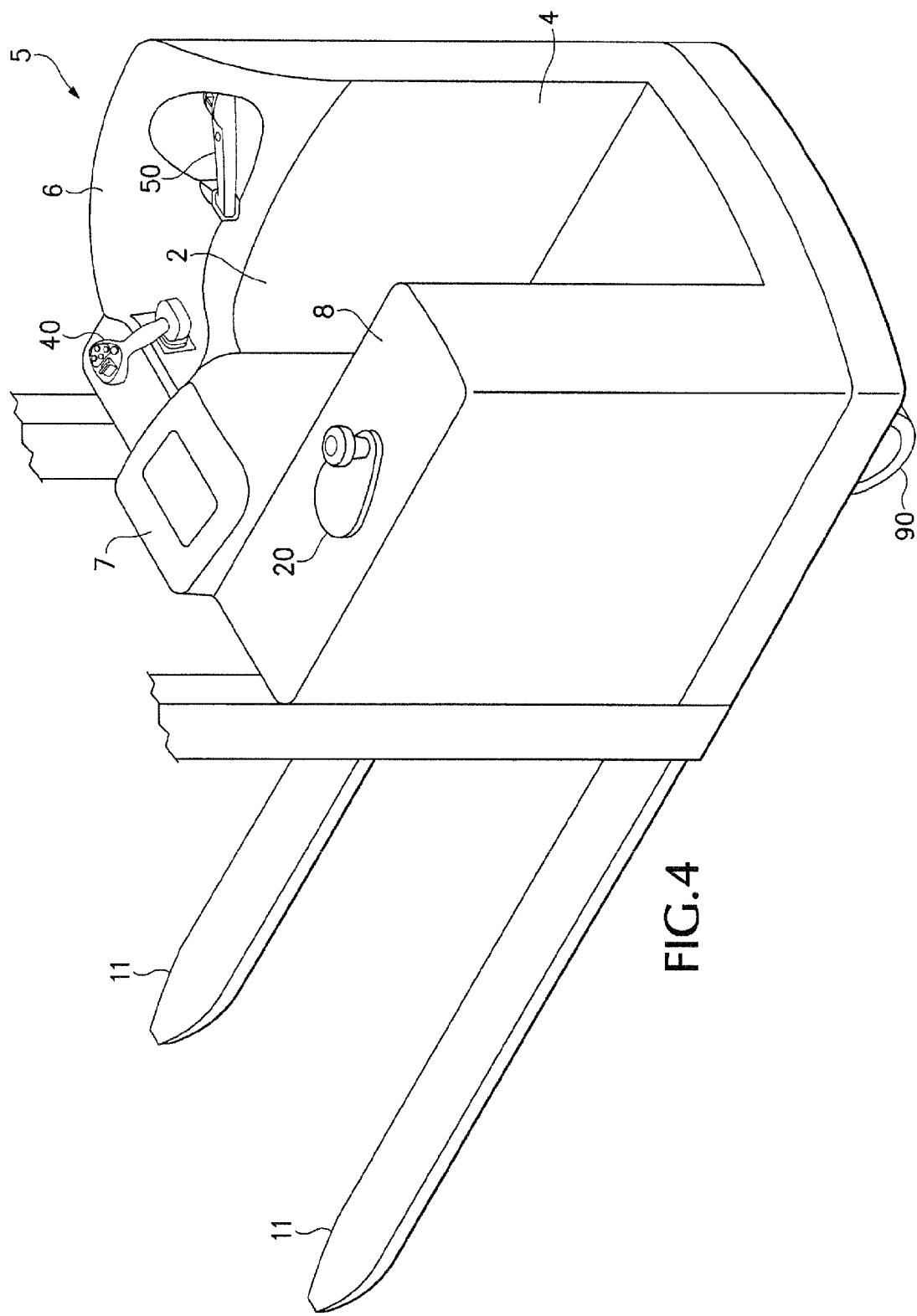
FIG. 4 is a rear elevation view of an industrial vehicle illustrating a primary control, a secondary control, and a steering apparatus.

FIG. 4 is a rear elevation view of an industrial vehicle 5 illustrating a vehicle control system including a primary control 40, a secondary control 50, and the steering apparatus 20. The secondary control 50 may provide similar control of vehicle operation as the secondary hand grip 14 described with reference to FIGS. 2 and 3, but is spaced apart from the primary control 40. The secondary control 50 is illustrated in the embodiment shown in FIG. 4 as being located near the rear of the vehicle 5, as a side opposite that of the steering apparatus 20. The secondary control 50 may be shaped as a grab handle to assist the operator of the vehicle 5 during ingress and egress of the operator compartment 2 as well as providing additional operator stability during vehicle travel.

A first control handle, or primary control 40, is shown being located near a first side or front 7 of the operator compartment 2 opposite an operator ingress 4. The primary control 40 may be configured to be rotated about one or more axes of rotation and control a rate of travel of the vehicle 5. A second control handle, or secondary control 50, may be mounted on a second or right side 6 of the operator compartment 2 between the first side of the operator compartment 2 and the operator ingress 4. The secondary control 50 may be rigidly mounted to the right side 6 of the operator compartment and configured to control the rate of travel of the industrial vehicle without being rotated or pivoted about any axis.

With the operator facing the rear/aft of the vehicle 5, opposite the forks 11, the secondary control 50 may be held by the operator's left hand while the steering apparatus 20 may be operated by the operator's right hand to steer the vehicle 5. With the operator facing the front/forks of the vehicle 5, the primary control 40 may be held by the operator's right hand while the steering apparatus 20 is controlled with the left hand. Either of the primary or secondary controls 40, 50 may be utilized to request a forward or reverse direction of travel of the vehicle 5.

FIG. 5 is a close up perspective view of the primary and secondary controls 40, 50 illustrated in FIG. 4. The secondary control 50 may be located at an end of the right side 6 of the operator compartment 2 adjacent the operator ingress 4. The secondary control 50 includes a grab handle 55 that may be rigidly mounted by a first end 52 and a second end 54 to the right side 6 of the operator compartment. The right side 6 of the operator compartment may include a recess 42 located about the grab handle 55 to provide access space or otherwise accommodate a hand of the operator during operation or grasping of the secondary control 50. The grab handle 55 may provide the operator with additional stability or point of contact when entering or leaving the operator compartment 2 or during operation of the vehicle 5.

A directional control 56 and an alert function or horn button 58 are visible on a top surface of the grab handle 55. The directional control 56 may be located at or below the top surface of the grab handle 55 to avoid accidental actuation by the operator. The direction control 56 may control a direction or rate of travel of the vehicle. The primary control 40 may be configured to be operated by an operator oriented in a first direction of vehicle travel, and the secondary control 50 may be configured to be operated by an operator oriented in a second direction of vehicle travel opposite the first direction.

FIG. 6 illustrates an example embodiment of the primary control 40 and a secondary control 60 in an alternate arrangement, where the secondary control 60 is shown located in the approximate midpoint of the operator compartment 2, intermediate the front 7 and the operator ingress 4. The secondary control 60 may be located at a side opposite that of a steering apparatus 20, at any position intermediate the front 7 and the operator ingress 4.

With the operator facing the rear/aft of the vehicle 5, opposite the forks 11, the secondary control 60 located at the midpoint may be held by the operator's left hand while the steering apparatus 20 is operated by the operator's right hand to steer the vehicle 5. Alternatively, with the operator facing the front/forks of the vehicle 5, the secondary control 60 may be held by the operator's right hand while the steering apparatus 20 is controlled with the left hand. The secondary control 60 is therefore accessible to the operator while facing or traveling in either the front or rear/aft directions. Either of the primary or secondary controls 40, 60 may be utilized to request a forward or reverse direction of travel of the vehicle 5.

The secondary control 60 includes a grab handle 65 that may be rigidly mounted by a first end 62 and a second end 64 to the right side 6 of the operator compartment. The right side 6 of the operator compartment may include a recess 42 located about the grab handle 65 to provide access space or otherwise accommodate a hand of the operator during operation or grasping of the secondary control 60. The grab handle 65 may provide the operator with additional stability or point of contact when entering or leaving the operator compartment 2 or during operation of the vehicle 5.

To accommodate travel and operator orientations in front and rear directions, the secondary control 60 may be provided with multiple direction controls 66A, 66B. Directional controls 66A, 66B are visible on a side surface of the grab handle 65, however in an alternate embodiment they are provided on the top surface of the grab handle 65. The directional controls 66A, 66B may be located at or below the side surface of the grab handle 65 to avoid accidental actuation by the operator. The direction controls 66A, 66B may control a direction or rate of travel of the vehicle 5. The first direction control 66A may be configured to be operated by an operator facing a first direction of vehicle travel towards the vehicle forks 11, for example by the right hand of the operator. The second direction control 66B may be configured to be operated by an operator facing in a second direction of vehicle travel opposite the first direction, for example by the left hand of the operator. Horn buttons 68A and 68B may be provided to be easily accessible by either the right or left hand, respectively.

Figure 7:
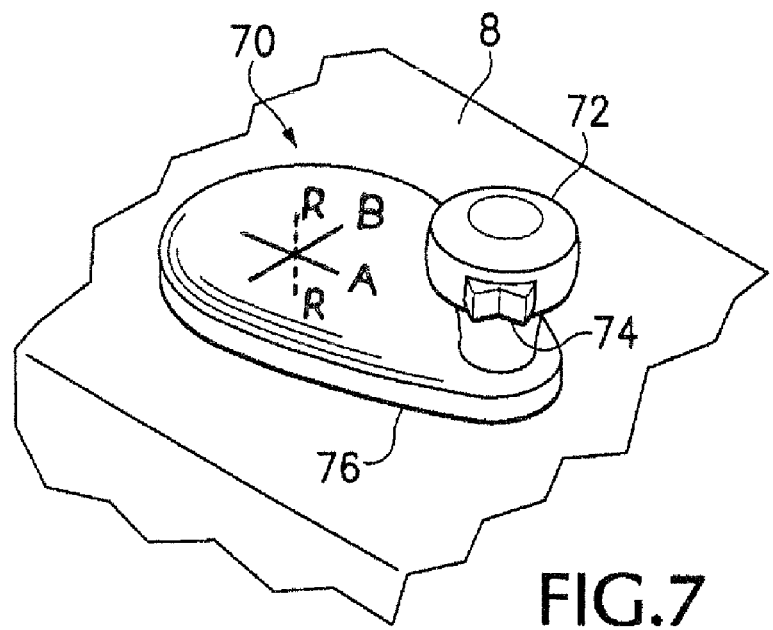
FIG. 7 is a perspective view of an example steering apparatus including a direction control.

FIG. 7 is a perspective view of an example steering apparatus 70 including a direction control 74. The direction control 74 is illustrated as being a toggle switch mounted on a steering assist 72. The steering assist 72 may be provided to facilitate a rotation of the steering apparatus 70 during operation of an industrial vehicle, such as the vehicle 5 illustrated in FIG. 1. The steering apparatus 70 is shown as being mounted to the left side 8 of the vehicle 5, however it could also be mounted on the front 7 or right side 6 in different embodiments. The steering apparatus 70 rotates in a plane AB that may be substantially parallel with a top surface of left side 8. The steering apparatus rotates about an axis of rotation R-R that is perpendicular to the plane AB. The steering assist 72 rotates about the perimeter of the steering apparatus 70 as the steering apparatus 70 is being rotated. In one embodiment, the steering assist 72 remains in a fixed orientation as it rotates about the steering apparatus 70, such that the direction control 74 points in the same direction with respect to the position of the operator. The direction control 74 may be thumb or finger activated to control a direction and rate of travel of the vehicle 5. For example, rotating or pressing the direction control 74 in a downward position may cause the vehicle 5 to move in the rear direction, while pressing the direction control 74 in an upward position may cause the vehicle 5 to move in the forward or front direction.

The steering assist 72 may be held by the operator while facing or traveling in the front and rear directions with the left and right hands, respectively. If the steering apparatus 70 is instead mounted in the right side 6 of the vehicle 5, then the steering assist 72 may be held by the operator while facing or traveling in the front and rear directions with the right and left hands, respectively. The direction control may be operated with the operator standing or oriented in either the front or rear directions. The operator may still determine to use a primary control located in the front 7 of the vehicle 5 for direction control when facing or traveling in the front direction. The operator may place their right hand on the steering assist 72 and utilize the direction control 74 when facing or traveling in the rear direction. In one embodiment, the steering assist 72 may be depressed downward in the direction of the steering apparatus 70 to activate an alert function or horn. In another embodiment, a horn button (not shown) is mounted on the steering assist 72 adjacent to the direction control 74.

Figure 8:
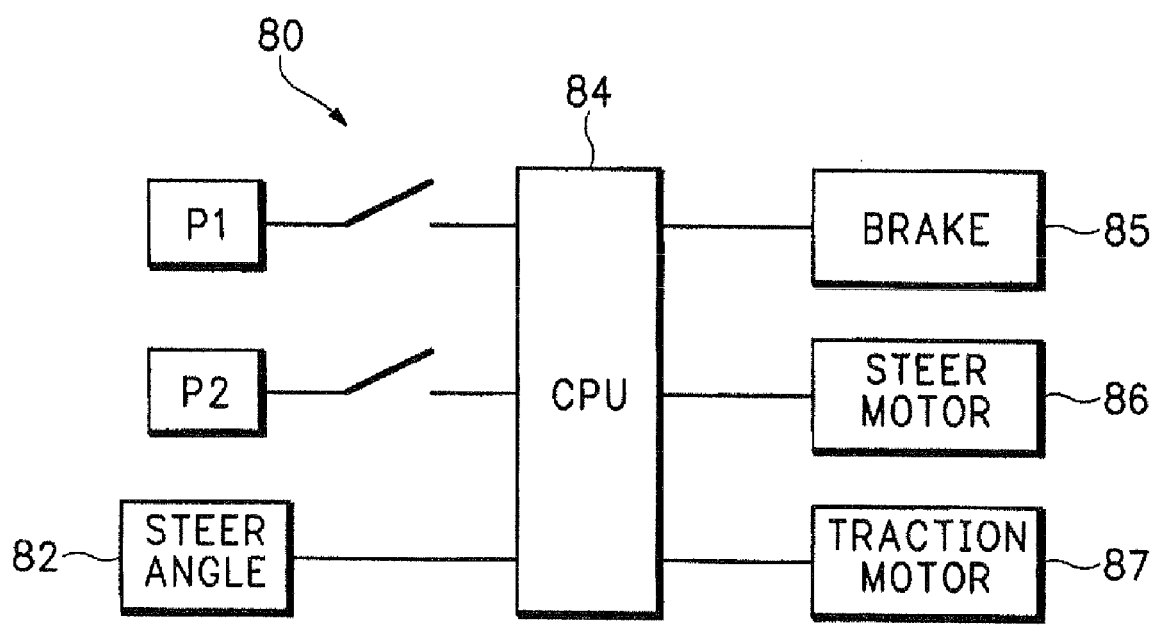
FIG. 8 is a simplified block diagram illustrating an example vehicle control system operable with a primary and secondary control.

FIG. 8 is a simplified block diagram illustrating an example vehicle control system operable with a steering system including a first and second control. A first operator presence sensor P1 may be associated with the first control and the second operator presence sensor P2 may be associated with the second control. A steer angle sensor 82 may be associated with a steering apparatus, such as the steering apparatus 20 of FIG. 1 and FIG. 4. Signals or input from the operator presence sensors P1, P2 and the steer angle sensor 82 may be provided to an onboard vehicle processor 84. The processor 84 may process the signals to control or modify an operation of a vehicle brake 85, a vehicle steer motor 86, or a vehicle traction motor 87.

The operator presence sensors P1, P2 may be used to determine which of the first or second controls is being operated. The operator presence sensors P1, P2 may be used to determine a first and second position of the operator. The operator presence sensors P1, P2 may be included in control handles, control levers, control grips or direction controls in order to sense when an operator hand is in proximity. For example, a first position sensor P1 may be integrated into the primary hand grip 12 of FIG. 2 or the primary control 40 of FIG. 6 to determine when the operator is oriented in a first position, such as facing the forks 11 of the vehicle 5. A second position sensor P2 may be integrated into the secondary hand grip 14 of FIG. 2 or the secondary control 50 of FIG. 4 to determine when the operator is oriented in a second position, opposite the first position.

In one embodiment, the operator presence sensors P1, P2 may be used to activate or deactivate certain vehicle controls depending if the operator's hand is sensed or not, respectively. For example, when the second sensor P2 senses the operator's hand on the secondary control 50 of FIG. 4, functions associated with the primary control 40 may be deactivated. Similarly, when the second sensor P2 in the primary control 40 detects an operator's hand, functions associated with the secondary control 50 may be deactivated. In this manner, only one of two directional controls may be activated at any one give time, and inadvertent actuation of a control may be avoided. This sensor logic may be implemented for each of the above embodiments described with reference to FIGS. 2-7.

The sensors P1, P2 may be made to operate by sensing body heat, sensing pressure at multiple points on a control, or some other type of proximity sensing device. In one embodiment, detection of an operator's hand by both sensors P1, P2 would deactivate certain functions associated with both a first and second control. For example, an activation of both sensors P1, P2 may automatically deactivate the traction motor 87, and apply the vehicle brake 85.

In one embodiment, the second operator presence sensor P2 is associated with the second control, such as the secondary hand grip 14 or the secondary control 50. When the second operator presence sensor P2 detects the proximity of the operator, a steering sense of the steering apparatus 20 may be reversed. In this example, the processor 84 may control the steer motor 86 to steer the steer tires 90 in an opposite rotational sense than if the processor 84 received a signal from the first operator presence sensor P1.

Figure 9:
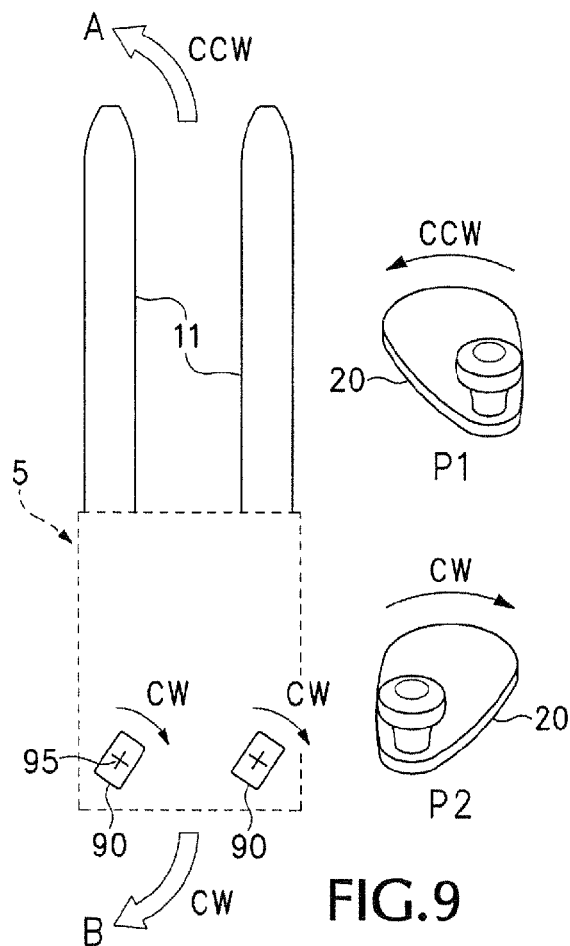
FIG. 9 illustrates an example of steering a vehicle in a forward and reverse direction.

FIG. 9 illustrates an example of steering a vehicle 5 in a forward and reverse direction. The steering apparatus 20 is shown with respect to operation of the vehicle 5 according to the first and second operator positions corresponding to first and second presence sensors P1, P2. The vehicle 10 is shown in phantom lines in order to more clearly illustrate the relationship between control of the steering apparatus 20 and the operation of the steered tires 90. The steered tires 90 are shown as being rotated in a clockwise (CW) direction with respect to vertical axes of rotation 95. When the vehicle 5 shown in FIG. 9 travels in a fork-first direction A, it turns in a counterclockwise (CCW) manner. However, when the vehicle 5 shown in FIG. 9 travels in a direction B opposite the forks, rotating the steered tires 90 in the clockwise direction causes the vehicle 5 to turn in a clockwise manner. One skilled in the art would appreciate that the steering apparatus 20 rotates about an axis of rotation similar to axis of rotation R-R illustrated with steering apparatus 70 of FIG. 7.

In a first case of FIG. 9, the steering apparatus 20 operates according to a first operator position associated with the first operator presence sensor P1 and the vehicle is traveling in a forward direction indicated as direction A. Rotating the steering apparatus 20 in the counterclockwise direction causes the steered tires 90 to rotate in the clockwise direction. While moving in the forward direction A, the counterclockwise rotation of the steering apparatus 20 results in a counterclockwise turn (to the left, with the operator facing towards direction A) of the vehicle 5.

In a second case of FIG. 9, the steering apparatus 20 operates according to a second operator position associated with the second operator presence sensor P2 and the vehicle 5 is traveling in a rearward direction indicated as direction B. Rotating the steering apparatus 20 in the clockwise direction causes the steered tires 90 to rotate in the clockwise direction. While moving in the rearward direction B, the clockwise rotation of the steering apparatus 20 results in a clockwise turn (to the right, with the operator facing towards direction B) of the vehicle 5.

Figure 10:
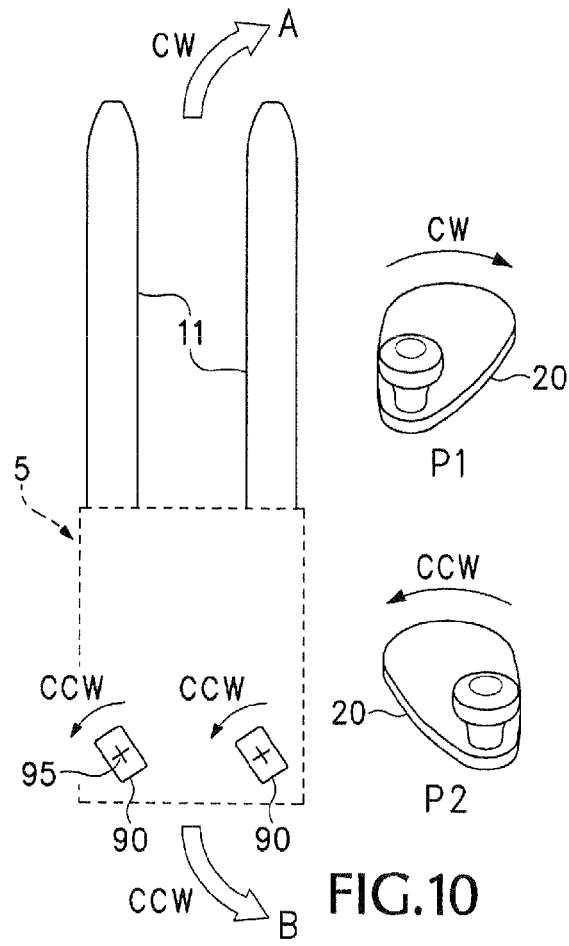
FIG. 10 illustrates a further example of steering a vehicle in a forward and reverse direction.

FIG. 10 illustrates a further example of steering a vehicle 5 in a forward and reverse direction. The steered tires 90 are shown as being turned in a counterclockwise direction with respect to vertical axes of rotation 95. When the vehicle 5 shown in FIG. 10 travels in fork-first direction A, it turns in a clockwise manner. However, when the vehicle 5 shown in FIG. 10 travels in a direction B opposite the forks, rotating the steered tires 90 in the counterclockwise direction causes the vehicle 5 to turn in a counterclockwise manner.

In a first case of FIG. 10, the steering apparatus 20 operates according to a first operator position associated with the first operator presence sensor P1 and the vehicle 5 is traveling in a forward direction indicated as direction A. Rotating the steering apparatus 20 in the clockwise direction causes the steered tires 90 to rotate in the counterclockwise direction. While moving in the forward direction A, the clockwise rotation of the steering apparatus 20 results in a clockwise turn (to the right, with the operator facing towards direction A) of the vehicle 5.

In a second case of FIG. 10, the steering control wheel 20 operates according to a second operator position associated with the second operator presence sensor P2 and the vehicle is traveling in a rearward direction indicated as direction B. Rotating the steering apparatus 20 in the counterclockwise direction causes the steered tires 90 to rotate in the counterclockwise direction. While moving in the rearward direction B, the counterclockwise rotation of the steering apparatus 20 results in a counterclockwise turn (to the left, with the operator facing towards direction B) of the vehicle 5.

By configuring the steering apparatus 20 to have an opposite rotational steering sense associated with the first operator presence sensor P1 as compared with the second operator presence sensor P2, the steering apparatus 20 performs similarly to an automotive steering system regardless of the operator orientation.

Whereas FIGS. 9 and 10 illustrate a system including two operator presence sensors P1 and P2, in an alternate embodiment an operator presence detection system may include a single operator presence sensor, such as sensor P1 or P2. When the sensor P1, P2 is not activated, the operator presence detection system may indicate that the steer motor 86 of FIG. 8 or the steering apparatus 20 should operate in a standard or normal steering sense. A standard steering sense may be associated with an operator position oriented towards the front 7 of the vehicle 5 shown in FIG. 1. In one embodiment, the standard steering sense is indicated by P1 in FIGS. 9 and 10.

When the sensor P1, P2 is activated, the steer motor 86 or steering apparatus 20 may be instructed to operate in an opposite or reverse steering sense compared to the standard steering sense. A reverse steering sense may be associated with an operator position oriented towards the ingress 4 of the vehicle 5 shown in FIG. 1. In one embodiment, the reverse steering sense is indicated by P2 in FIGS. 9 and 10. A processor, such as processor 84 of FIG. 8, may receive input from sensor P1, P2 prior to instructing the steer motor 86 or steering apparatus 20 and determining the corresponding steering sense.

Whereas the operator compartment 2 is shown and described having various components located at or near a right side 6, a front 7, a left side 8 or an ingress 4, one skilled in the art would understand that the components and controls could be provided at alternate locations not specifically illustrated in the embodiments. For example, the steering apparatus 20 of FIG. 1 or FIG. 4 could be located at or near the right side 6 and one or more of the controls 10, 40, 50 or 60 could be located at or near the left side 4. Furthermore, the terms left and right, front and rear, and forward and reverse, may be similarly interchanged depending on the particular orientation or application of a motorized or industrial vehicle, and are used herein for illustrative purposes only.

The system and apparatus described above can use dedicated processor systems, micro controllers, programmable logic devices, or microprocessors that perform some or all of the operations described above may be implemented in software and other operations may be implemented in hardware.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A control system for an industrial vehicle comprising:
a first control handle located near a first side of an operator compartment, wherein the first control handle is configured to be rotated about one or more axes of rotation, and wherein the first control handle is further configured to control a rate of travel of the industrial vehicle; and
a second control handle rigidly mounted to the operator compartment, wherein the second control handle is configured to control the rate of travel of the industrial vehicle without being rotated or pivoted about any axis.

2. The control system according to claim 1, wherein the second control handle includes a control mounted thereon for controlling the rate of travel of the industrial vehicle.

3. The control system according to claim 1, wherein the first control handle is configured to be operated in a first direction of vehicle travel, and wherein the second control handle is configured to be operated in a second direction of vehicle travel opposite the first direction.

4. The control system according to claim 1, further comprising an operator presence detection system that determines which of the first or second control handles is being operated.

5. The control system according to claim 4, wherein the presence detection system disables one or both of the first and second control handles upon detecting an operator presence.

6. The control system according to claim 1, wherein the second control handle is located at an end of a second side of the operator compartment adjacent an operator ingress, and wherein the first side of the operator compartment with the first control handle is located opposite the operator ingress.

7. The control system according to claim 1, wherein the second control handle is located at an approximate mid-point of a second side of the operator compartment, and wherein the mid-point is intermediate the first side and an operator ingress of the operator compartment.

8. The control system according to claim 1, further comprising a steering apparatus located on a side of a vehicle operator compartment opposite that of the second control handle, wherein the steering apparatus is positioned to be accessible to an operator while operating the first control handle and the second control handle.

9. The control system according to claim 8, wherein the first control handle and the steering apparatus are configured to be simultaneously operated in a first direction of vehicle travel, and wherein the second control handle and the steering apparatus are configured to be simultaneously operated in a second direction of vehicle travel opposite the first direction.

10. The control system according to claim 9, further comprising a sensor associated with the first control handle or the second control handle, wherein a steering sense of the steering apparatus is reversed when the sensor is activated.

11. The control system according to claim 1, further comprising a first proximity sensor associated with the first control handle and a second proximity sensor associated with the second control handle.

12. An industrial vehicle, comprising:
a first means for controlling the industrial vehicle, wherein the first means for controlling the industrial vehicle is located near a first side of an operator compartment, wherein the first means for controlling is configured to be rotated about one or more axes of rotation, and wherein the first means for controlling is further configured to control a rate of travel of the industrial vehicle; and a second means for controlling the industrial vehicle, wherein the second means for controlling is configured to control the rate of travel of the industrial vehicle without being rotated.

13. The industrial vehicle according to claim 12, wherein the second means for controlling includes a control mounted thereon for controlling the rate of travel of the industrial vehicle.

14. The industrial vehicle according to claim 12, wherein the first means for controlling is configured to be operated in a first direction of vehicle travel, and wherein the second means for controlling is configured to be operated in a second direction of vehicle travel opposite the first direction.

15. The industrial vehicle according to claim 12, further comprising means for detecting an operator presence, wherein the means for detecting determines which of the first or second means for controlling is enabled.

16. The industrial vehicle according to claim 15, wherein the means for detecting disables one or both of the first and second means for controlling upon detecting the operator presence.

17. The industrial vehicle according to claim 12, wherein the second means for controlling is located at an end of a second side of the operator compartment adjacent an operator ingress, and wherein the first side of the operator compartment is located opposite the operator ingress.

18. The industrial vehicle according to claim 12, wherein the second means for controlling is located at an approximate mid-point of a second side of the operator compartment, and wherein the mid-point is intermediate the first side and an operator ingress of the operator compartment.

19. The industrial vehicle according to claim 12, wherein the first means for controlling is further configured to conform to an operator's right hand in a first operator orientation, and wherein the second means for controlling is configured to conform to an operator's left hand in a second operator orientation opposite the first operator orientation.

20. The industrial vehicle according to claim 12, wherein the first and second means for controlling are configured to enable control of a direction of travel of the industrial vehicle from different operator orientations.

* * * * *